United States Patent
Thomas et al.

(10) Patent No.: US 12,121,823 B2
(45) Date of Patent: Oct. 22, 2024

(54) AUTOMATIC CLASSIFICATION AND REPORTING OF INAPPROPRIATE LANGUAGE IN ONLINE APPLICATIONS

(71) Applicant: NVIDIA Corporation, Santa Clara, CA (US)

(72) Inventors: Jithin Thomas, Pune (IN); Neilesh Chorakhalikar, San Jose, CA (US); Ambrish Dantrey, Pune (IN); Revanth Reddy Nalla, Maharashtra (IN); Prakshep Mehta, Maharashtra (IN)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 17/959,176

(22) Filed: Oct. 3, 2022

(65) Prior Publication Data
US 2023/0182029 A1 Jun. 15, 2023

Related U.S. Application Data

(63) Continuation of application No. 16/884,675, filed on May 27, 2020, now Pat. No. 11,458,409.

(51) Int. Cl.
| | |
|---|---|
| *A63F 13/87* | (2014.01) |
| *A63F 13/355* | (2014.01) |
| *A63F 13/71* | (2014.01) |
| *A63F 13/77* | (2014.01) |
| *A63F 13/79* | (2014.01) |

(52) U.S. Cl.
CPC ............ *A63F 13/87* (2014.09); *A63F 13/355* (2014.09); *A63F 13/71* (2014.09); *A63F 13/77* (2014.09); *A63F 13/79* (2014.09)

(58) Field of Classification Search
CPC ........ A63F 13/77; A63F 13/71; A63F 13/355; A63F 13/79; A63F 13/87
USPC .......................................................... 463/42
See application file for complete search history.

(56) References Cited

U.S. PATENT DOCUMENTS

| | | | | |
|---|---|---|---|---|
| 8,554,791 | B1* | 10/2013 | Lavin | G06F 16/16 707/783 |
| 10,440,063 | B1* | 10/2019 | Nevick | H04N 21/222 |
| 10,440,324 | B1* | 10/2019 | Lichtenberg | H04L 12/1827 |
| 11,120,799 | B1* | 9/2021 | Sundararaman | G06F 40/253 |
| 11,330,315 | B2* | 5/2022 | Punja | H04N 21/25883 |
| 11,458,409 | B2 | 10/2022 | Thomas et al. | |

(Continued)

*Primary Examiner* — Michael A Cuff
(74) *Attorney, Agent, or Firm* — Taylor English Duma L.L.P.

(57) ABSTRACT

In various examples, game session audio data—e.g., representing speech of users participating in the game—may be monitored and/or analyzed to determine whether inappropriate language is being used. Where inappropriate language is identified, the portions of the audio corresponding to the inappropriate language may be edited or modified such that other users do not hear the inappropriate language. As a result, toxic behavior or language within instances of gameplay may be censored—thereby enhancing the user experience and making online gaming environments safer for more vulnerable populations. In some embodiments, the inappropriate language may be reported—e.g., automatically—to the game developer or game application host in order to suspend, ban, or otherwise manage users of the system that have a proclivity for toxic behavior.

20 Claims, 7 Drawing Sheets

(56) References Cited

U.S. PATENT DOCUMENTS

| | | | |
|---|---|---|---|
| 2002/0019879 A1* | 2/2002 | Jasen | H04W 72/543 |
| | | | 709/240 |
| 2004/0261021 A1* | 12/2004 | Mittal | G06F 16/972 |
| | | | 707/E17.058 |
| 2009/0125607 A1* | 5/2009 | Rhoads | H04N 21/8358 |
| | | | 707/E17.014 |
| 2010/0211431 A1* | 8/2010 | Lutnick | G06Q 30/0267 |
| | | | 705/14.12 |
| 2013/0110511 A1* | 5/2013 | Spiegel | G10L 15/22 |
| | | | 704/E15.001 |
| 2013/0150117 A1* | 6/2013 | Rodriguez | G10L 15/08 |
| | | | 455/550.1 |
| 2013/0253910 A1* | 9/2013 | Turner | G06F 40/253 |
| | | | 704/9 |
| 2015/0194151 A1* | 7/2015 | Jeyachandran | G10L 15/20 |
| | | | 704/233 |
| 2016/0147775 A1* | 5/2016 | Nauze | G06F 40/30 |
| | | | 707/740 |
| 2016/0294762 A1* | 10/2016 | Miller | H04L 67/306 |
| 2017/0206064 A1* | 7/2017 | Breazeal | B25J 11/0005 |
| 2018/0048935 A1* | 2/2018 | Ashoori | H04N 21/23418 |
| 2018/0077025 A1* | 3/2018 | Helvey | H04L 43/0894 |
| 2019/0270021 A1* | 9/2019 | Hume | A63F 13/87 |
| 2020/0129864 A1* | 4/2020 | Tran | A63F 13/798 |
| 2020/0213680 A1* | 7/2020 | Ingel | H04N 21/44008 |
| 2020/0359108 A1* | 11/2020 | Lee | H04H 60/33 |
| 2021/0090575 A1* | 3/2021 | Mahmood | G10L 17/10 |
| 2021/0117685 A1* | 4/2021 | Sureshkumar | H04N 21/812 |

* cited by examiner

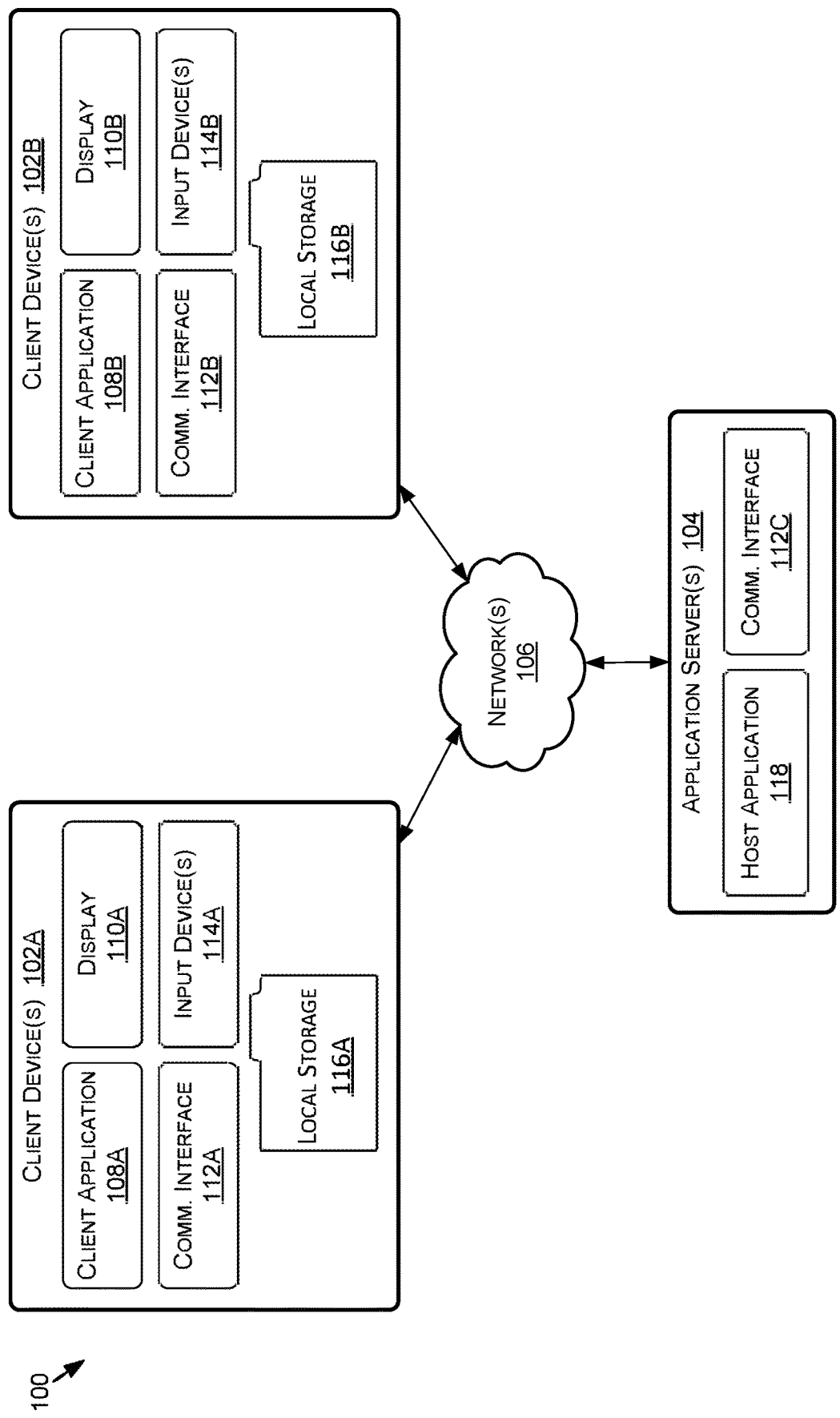

AUTOMATIC CLASSIFICATION AND REPORTING OF INAPPROPRIATE LANGUAGE IN ONLINE APPLICATIONS

CROSS-REFERENCE TO RELATED APPLICATIONS

This application is a continuation of U.S. patent application Ser. No. 16/884,675, filed May 27, 2020, which is hereby incorporated by reference in its entirety.

BACKGROUND

Users of online video games—such as massively multi-player online games (MMOs)—are often the victims of offensive and/or inappropriate language. For example, a player may lose control, perhaps out of frustration, anger or otherwise, and begin to direct abusive comments at other players in the game. A victim of the abusive comments may ask the other player to stop the abusive behavior, however, as is often the case in online scenarios, the player may believe that the victim has no mode of recourse and continue the abuse. In other scenarios, the comments may not be directed at any particular player. Instead, a player may use derogatory slurs or other demeaning language to merely voice their frustration. While other players may mute another player who exhibits toxic behavior online, it may not be desirable to mute all of the user's speech. As such, this all or nothing approach often leads players to either tolerate the toxic behavior or forego any sort of verbal interactions.

A traditional system may provide these users with a portal for reporting such undesirable language. To do so, a user must manually report each instance of the objectionable language or behavior. When a report is received, the report must be reviewed by the platform or game developer to verify the language is inappropriate, and to take any appropriate actions (e.g., ban the harassing user, suspend the harassing user, issue a warning, etc.). However, this process is often cumbersome and time consuming, which results in many users simply deciding not to report offensive language. For example, to submit a report of abusive behavior, a user may be required to identify the offensive user in a game, access a reporting portal, select the offensive user from a list of recent users, and then choose from a list of abuse options and/or describe the details of the abuse. Furthermore, even when an avenue exists for the users to report toxic behavior, users are still subject to the behavior prior to their ability to generate a report.

SUMMARY

Embodiments of the present disclosure relate to detecting and mitigating toxic behavior in online games. Systems and methods are disclosed that classify words as being inappropriate, and that determine a portion of audio data that corresponds to the inappropriate words in order to perform real-time, or near real-time, actions on the audio data.

In contrast to conventional systems, such as those described above, the present system processes audio data of users as the users converse during online gameplay to detect, classify, edit, and/or report offensive and/or inappropriate language. According to some examples, as users converse while playing an online video game, the audio from the various conversations may be processed by language classifier that may include a deep neural network (DNN), such as a convolutional neural network (CNN), to identify characters (e.g., letters, symbols, numbers, etc.), and these characters may be analyzed by components of the language classifier to determine whether a user has spoken an offensive or inappropriate word or phrase. When such words or phrases are detected, a timestamp corresponding to the offensive or inappropriate word or phrase may be determined (e.g., by accessing time stamps corresponding to each character). This may allow for performing various actions using the audio from the conversation, such as generating and submitting a report, muting the offensive word during playback, removing the offensive portion of the audio completely, etc. As a result, the offensive language may be filtered out prior to the harassing content being transmitted to other users of the game—thereby limiting the effect of the harassing behavior—and a report may be generated without requiring manual generation by a user.

BRIEF DESCRIPTION OF THE DRAWINGS

The present systems and methods for curbing toxic behavior in online games are described in detail below with reference to the attached drawing figures, wherein:

FIG. 1A is an example system diagram of a language classification system, in accordance with some embodiments of the present disclosure;

DETAILED DESCRIPTION

Figure 1B:
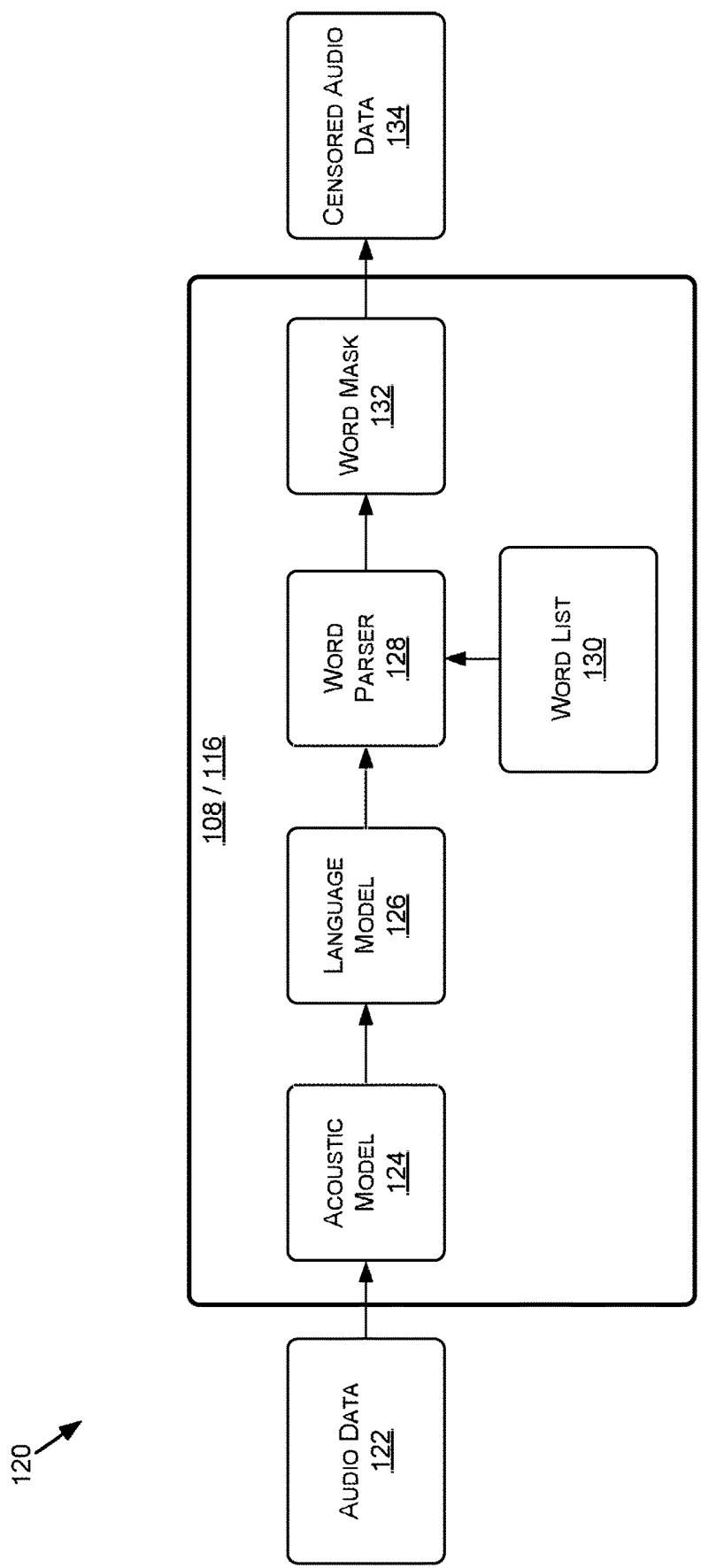
FIG. 1B is an example system diagram of a language classifier of the language classification system of FIG. 1A, in accordance with some embodiments of the present disclosure.

Systems and methods are disclosed related to detecting and mitigating toxic behavior in online games. Although primarily described herein with respect to gaming implementations, this is not intended to be limiting, and the systems and methods of the present disclosure may be implemented in any implementation for censoring audio data. For non-limiting examples, the systems and methods described herein may be implemented for video conferencing applications, chat applications, telephone calling applications, or customer service applications.

In some embodiments, game session audio data for a specific user may be captured and processed locally (e.g., on a client device of the user) before transmission to a host device(s) of the game or a client device of another user playing the game. As a result, captured audio may then be provided to a language classifier as input data. The language classifier may output audio data representative of identified characters from the captured audio in real-time, or near real-time, such that a delay in audio is not perceived by users of the game.

In some embodiments, a deep neural network (DNN) of a language classifier may analyze sets of characters to identify predicted words from the sets of characters. The predicted sets of characters may be processed by a language model and a word parser to identify and parse out individual words, which may allow the language classifier to determine whether identified words may be offensive, harassing, or otherwise inappropriate by comparing the identified words to a list of inappropriate words. For example, when an accuracy probability or confidence for an identified word or phrase exceeds a threshold, the word or phrase may be classified as being either appropriate or inappropriate by accessing a dictionary (or word list) of inappropriate words or phrases and comparing the word or phrase to the dictionary of inappropriate words (e.g., words that are profane, abusive, derogatory, taunting, harassing, etc.). When a word or phrase is identified as being inappropriate, an audio clip and a timestamp—each corresponding to the word or phrase—may be identified and recorded.

For example, the system may automatically generate a visualization—such as a text transcript or report—of verbal communication from one or more users. Bounding boxes corresponding to output characters that are included in the inappropriate word or phrase may be generated in the transcript. Alternatively, bounding boxes or other similar notation may be used to annotate specific moments or durations of time in a representation of the time elapsed during a game or application session. The bounding boxes may correspond to individual characters and may represent a portion (e.g., a period of time) within the audio data that corresponds to the character. Advantageously, by providing bounding shapes or other identifiers and signifiers that may represent portions of time, the predicted characters may be mapped to timestamps of the audio data used to generate the predicted characters, which may aid the language classifier system or a human moderator in performing actions (e.g., edit audio data or report abuse) in response to detected inappropriate language.

With reference to the dictionary of inappropriate words, characters, or phrases, the dictionary may be universal (e.g., apply to each game or other application type) or may be customized to a specific game, user, region, rating category, etc. For example, a benefit of the present system is that the language classification model may leverage a dictionary that is specific to a particular application, thus allowing the system to scale easily to new and different applications while still performing effectively within each different application. For example, a phrase used within a first game or application may be considered harassing while the same phrase used in a second game may be considered benign. In addition, as words or phrases gain or lose meaning over time (e.g., due to modern topics, trends, fads, etc.) the list of offensive words may be amended accordingly and in real-time or near real-time. For example, even within a single instance of a game, the system may update (e.g., periodically and/or incrementally) the dictionary with inappropriate words based on an analysis of conversations between users and reactions from other users. For example, where a comment from a user elicits another user to speak harassing words, words or phrases corresponding to the comment may be added to the dictionary. In addition, the dictionary may correspond to different languages, regions, countries, etc. For example, certain English words may be considered offensive in the United States, but may be considered inoffensive in the U.K. As such, the system may determine attributes of users in an instance of gameplay and compare identified words to the appropriate list(s)—or dictionary—of inappropriate words based on determining the language and/or region of the users in the instance of gameplay.

In addition to cross-referencing words or phrases against a dictionary, the words or phrases may also be analyzed for context. For example, where the language model includes a DNN, the DNN may be trained to identify contexts in which words or phrases are offensive and contexts in which they are not. Where the language model includes a non-deep learning application, heuristics may be used to determine context such as by analyzing audio, in-game events, user input behavior, and/or other game-related information in view of the specific words or phrases to determine the context and thus whether or not the words or phrases should be marked as offensive.

Once the inappropriate or offensive language is identified, audio data corresponding thereto may be locally tagged (e.g., so that the host device may identify which portions of the audio to mute, delete, obfuscate, report, etc.) and/or locally muted or deleted from the conversation audio to avoid an intended recipient from ever hearing the inappropriate language. In some embodiments, in addition, to editing, muting, or removing portions of the audio that correspond to inappropriate language, the identified words or phrases may also be used to generate automatic reports of the behavior of the user. For example, audio clips containing the inappropriate words—and some portion of the audio before and/or after the offensive words for context, in embodiments—may be generated and provided as part of an upload for generating a report. For example, a report may be automatically generated that includes the audio clip, the timestamp, the user's account information (e.g., gamer-tag, age, location, etc.), and any additional metadata a platform may need in order to properly address the inappropriate behavior. In addition, time stamps from the audio clip may be used to determine a corresponding portion of the game instance, and this portion may be used to generate a video clip to accompany the audio clip. The final report (including the metadata, audio clip, video clip, etc.) may be sent to an entity (e.g., a platform developer, a game developer, etc.) charged with monitoring appropriate behavior during gameplay.

Moreover, because some users may have knowledge of how to activate or deactivate certain functions within a game, the present system may mark or tag the associated files corresponding to the offensive language filter as essential files. By marking the files as essential files for the application—e.g., a cloud gaming application—users may be prevented from deleting the software designed to aid in preventing or limiting inappropriate behavior.

With reference to FIG. 1, FIG. 1 is an example system diagram of a language classification system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The language classification system 100 may include, among other things, client devices 102A and 102B (referred to collectively herein as "client devices 102") and an application server 104. Although the client devices 102A and 102B are illustrated in FIG. 1, this is not intended to be limiting. In any example, there may be any number of client devices 102. The language classification system 100 (and the components and/or features thereof) may be implemented using one or more computing devices, such as the computing device 600 of FIG. 6, described in more detail below.

Components of the language classification system 100 may communicate over network(s) 106. The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the language classification system 100 may communicate with one or more of the other components via one or more of the network(s) 106.

The client devices 102 may include a smart phone, a laptop computer, a tablet computer, a desktop computer, a wearable device, a game console, a virtual reality system (e.g., a headset, a computer, a game console, remote(s), controller(s), and/or other components), a streaming device, (e.g., an NVIDIA SHIELD), a smart-home device that may include an intelligent personal assistant, another type of device capable of supporting game play or other applications types (e.g., video conferencing, video chat, customer service chat, etc.), depending on the embodiment or implementation, and/or a combination thereof.

The client devices 102A/102B may include a client application 108A/108B, a display 110A/110B, a communication interface 112A/112B, an input device(s) 114A/114B, and local storage 116A/116B. Although only a few components and/or features of the client devices 102 are illustrated in FIG. 1, this is not intended to be limiting. For example, the client devices 102 may include additional or alternative components, such as those described below with respect to the computing device 600 of FIG. 6.

The client application 108A and 108B (referred to collectively herein as "client applications 108") may be a mobile application, a computer application, a console application, and/or another type of application. The client applications 108 may include instructions that, when executed by a processor(s), cause the processor(s) to, without limitation, receive input data representative of user inputs to the one or more input device(s) 114, transmit the input data to the application server(s) 104, retrieve application data from memory or local storage 116, receive the application data using the communication interfaces 112 from the application server(s) 104, and cause display of the application on the display 110. For example, the client application 108 may operate as a facilitator for enabling playing of a game associated with the client application on the client devices 102. The client application 108 may also include instructions that, when executed by a processor(s), cause the processor(s) to transmit data to, and receive data from, the application server(s) 104. For example, the client application 108A may transmit to the application server(s) 104 at least a portion of audio data that has been classified and/or modified by the client application 108A, and receive from the application servers(s) 104 at least a portion of audio data that has been classified and/or modified by the client application 108B. In other examples, the client application 108A may transmit to the application server(s) 104 audio data that has not been classified or modified by the client application 108. In such examples, the host application 118 may classify and/or modify and/or report inappropriate and offensive language.

The client application 108 and/or patches or updates to the client application 108 may be downloaded from the application server(s) 104 or may be downloaded from another server(s), such as a server of a content delivery network (CDN). For example, the application server(s) 104 may be located in a different country or on a different continent, so to reduce the download time, the client application 108 and/or the patches or updates may be stored on different servers around the globe. As such, when the client devices 102 are downloading the client application 108 and/or the patches or updates, the client devices 102 may connect to a more local server that is part of the CDN, for example.

In some examples, the client devices 102 may render the application (e.g., an online game or other online application) using the client application 108, while in other examples, the client devices 102 may receive display data (e.g., encoded display data, as described with respect to FIG. 5) and use the display data to display the application on the display 110. In some examples, a first client device, such as client device 102A, may render the game while a second client device, such as client device 102B, may receive the display data and display the application using the display data. In examples where the display data is received by the client device (e.g., where the client device 102 does not generate the rendering), the language classification system 100 may be part of an application or game streaming system, such as the game streaming system 500 of FIG. 5, described in more detail below.

The displays 110A and 110B (referred to collectively herein as "displays 110") may include any type of display capable of displaying the application (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the displays 110 may include more than one display (e.g., a dual-monitor display for computer gaming, a first display for configuring a game and a virtual reality display for playing the game, etc.). In some examples, the display is a touch-screen display, such as a touch-screen of a smart phone, tablet computer, laptop computer, or the like, where the touch-screen is at least one of the input device(s) 114 of the client devices 102.

The input device(s) 114A and 114B (referred to collectively herein as "input device(s) 114") may include any type of devices that are capable of providing user inputs to the application. The input device(s) may include a keyboard, a mouse, a microphone(s), a touch-screen display, a controller(s), a remote(s), a headset (e.g., sensors of a virtual reality headset), and/or other types of input devices.

The communication interface 112A, 112B, 112C (referred to collectively herein as "communication interfaces 112") may include one or more components and features for communicating across one or more networks, such as the network(s) 106. The communication interfaces 112 may be configured to communicate via any number of network(s) 106, described herein. For example, to communicate in the language classification system 100 of FIG. 1, the client devices 102 may use an Ethernet or Wi-Fi connection through a router to access the Internet in order to communicate with the application server(s) 104 and/or with other client devices 102.

The local storage 116A and 116B (referred to collectively herein as "local storage 116") may include any of a variety of computer-readable media. The computer-readable media may be any available media that can be accessed by the client devices 102. The computer-readable media may include both volatile and nonvolatile media, and removable and non-removable media. By way of example, and not limitation, the computer-readable media may comprise computer-storage media and communication media. The local storage 116 may include additional or alternative components, such as those described below with respect to the memory 604 of FIG. 6. In accordance with some embodiments of the present disclosure, portions of the client application 108 may be stored in the local storage 116. For example, portions of the client application 108 necessary to execute language classification operations of the language classification system 100 may be stored in the local storage 116 as essential files of the client application 108, such that the client application 108 may not operate without the portions of the client application 108.

In some embodiments, application session audio data may be captured by the client application 108A via input device(s) 114A and processed locally on the client device 102A before transmission to the application server(s) 104 or to the client device 102B. As explained herein, the system 100 (e.g., the client applications 108 and/or the host application 118) may identify audio clips from among the recorded application-session audio data that includes inappropriate speech, such as, for example, audio clips during which user communication is offensive, harassing, or otherwise inappropriate. Identifying clips of audio data including inappropriate speech may be useful in performing various actions, such as generating an abuse report or modifying a clip of audio data. Clips of audio data including inappropriate speech may be identified by a language classifier 120, as described in relation to FIG. 1B. Further, as context may be relevant for determining whether speech is inappropriate, additional application data may be recorded or identified, such as video data, geolocation of users, and/or a game rating, which may be useful for identifying interesting clips in an unsupervised manner.

A language classifier of the client applications 108 may output data representative of identified characters corresponding to words from captured audio data to allow for editing actions to be performed on the audio data in real-time or near real-time, such that any delay in audio is not perceived by a user receiving the audio data. For example, a first user playing a game on client device 102A may speak a derogatory slur into a microphone (e.g., input device 114A) during an instance of gameplay (e.g., via client application 108A) and, before audio data corresponding to the derogatory slur is transmitted over network 106 for a second user to hear the derogatory slur, the language classifier of client application 108A may identify the derogatory slur as inappropriate language and mute, remove, or otherwise edit the derogatory slur. Modified audio data with the muted derogatory slur may then be transmitted by the communication interface 112A, via network 106 and/or the application server(s) 104, to the communication interface 112B of the client device 102B where the second user may hear the modified audio data. Advantageously, the second user never hears the derogatory slur.

In some embodiments, in addition, to editing portions of the audio that correspond to offensive language, identified words or phrases may cause the client application 108 to generate an abuse report on behalf of a user. The abuse report may include audio clips containing identified inappropriate language, video clips, timestamps, user information (e.g., usernames of abuser and victim), and additionally available metadata that may be necessary for an entity or platform to properly address the abusive behavior. For example, audio clips containing the identified offensive words, and some portion of the audio before and/or after the offensive words for context, may be generated and provided as part of the abuse report. Moreover, time stamps associated with the audio clip may be used to determine a corresponding portion of a game instance. This corresponding portion may then be used to generate corresponding video clips to accompany the audio clips in the abuse report.

The final abuse report may be sent to a host application 118 where an entity charged with monitoring inappropriate behavior (e.g., platform developer, game developer, etc.) may review the abuse report and take appropriate action. In some embodiments, the abuse report may be sent automatically on behalf of a victim of inappropriate language. Additionally, or alternatively, the abuse report may be generated and sent to the victim for review. For example, an abuse threshold may be established such that a certain level of abuse (e.g., based on a frequency, a score associated with words or phrases in a dictionary, or victim response) may generate a report that is only sent to the victim to allow the victim to evaluate whether to submit the abuse report. In contrast, a level of abuse that exceeds a threshold may cause the abuse report to be automatically sent on the user's behalf.

Files associated with classifying inappropriate language, as discussed herein, may be included in a hidden folder of local storage 116 such that the files are not displayed by default when showing a file directory listing. Moreover, as some users may have knowledge of how to activate or deactivate certain functions within an application, the files associated with classifying inappropriate language may be marked or tagged as essential files. By marking the files as essential files for the application—e.g., a cloud gaming application—users may be prevented from deleting the software designed to aid in preventing or limiting offensive behavior.

The application server(s) 104 may include host application 118 and communication interface 112C. The host application 118 may correspond to the client applications 108. However, rather than performing language classification operations locally on client devices 102, the host application 118 may perform the language classification operations described herein on the application servers 104. As described above, the communications interface 112C may include one or more components and features for communicating across one or more networks. The application servers 104 may further include one or more servers for storing, trimming, classifying, and/or categorizing application-session audio data. Although only a few components and/or features of the application server(s) 104 are illustrated in FIG. 1, this is not intended to be limiting. For example, the application server(s) 104 may include additional or alternative components, such as those described below with respect to the computing device 600 of FIG. 6.

In some embodiments, the editing or modifying of the audio data to remove, mute, or otherwise change the audio data based on inappropriate language may be performed by the client devices 102, such that the application server(s) 104 and/or the other client device 102 may be unaware that the received audio data has been edited or modified. In other embodiments, the editing or modifying of the audio data may be performed using the client devices 102 and the application server(s) 104. For example, the client applications 108 may determine the portions of the audio that is to be modified or edited, and may transmit this information to the application server(s) 104. The host application 118 may then process this information representing the portion of the audio to be modified in order to edit or modify the audio data prior to transmission to the other client devices 102. Leveraging an application server(s) 104—which may include any number of parallel processing units, such as GPUs and/or nodes thereof, and may additionally have greater available compute resources than the client devices 102—may enable more real-time or near real-time deployment of the audio editing or modification system. In some embodiments, the editing or modifying of the audio data may be executed entirely on the application server(s) 104. As such, the language classifier 120 of FIG. 1B, described in more detail below, may be executed using the client devices 102, the application server(s) 104, or a combination thereof.

Now referring to FIG. 1B, FIG. 1B is an example language classifier 120 of the client applications 108/116. FIG. 1B shows audio data 122, acoustic model 124, language model 126, word parser 128, word list 130, work mask 132, and censored audio data 134. In some embodiments, the language classifier 120 may be included as a part of the client applications 108 and/or host application 118, while in other embodiments, the language classifier may be a separate application that may be communicatively coupled to the client applications 108 and/or the host application 118—e.g., via one or more application programming interfaces (APIs)—in order to monitor and/or edit the audio data, and send the modified audio back to the client application 108 and/or the host application 118.

In some embodiments, the language classifier 120—e.g., the acoustic model 124, the language model 126, the word parser 128, etc.—may include or leverage one or more DNNs. The DNNs may include any type of DNN or machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), lane detection algorithms, computer vision algorithms, and/or other types of machine learning models.

As an example, such as where the DNN includes a CNN (e.g., a CNN 200 of FIG. 2), the DNN may include any number of layers. One or more of the layers may include an input layer. The input layer may hold values associated with the audio data 122 (e.g., before or after post-processing). One or more layers may include convolutional layers. The convolutional layers may compute the output of neurons that are connected to local regions in an input layer, each neuron computing a dot product between their weights and a small region they are connected to in the input volume. One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer. One or more of the layers may include a pooling layer. The pooling layer may perform a down sampling operation along the spatial dimensions (e.g., the height and the width), which may result in a smaller volume than the input of the pooling layer. One or more of the layers may include one or more fully connected layer(s). Each neuron in the fully connected layer(s) may be connected to each of the neurons in the previous volume. The fully connected layer may compute class scores, and the resulting volume may be 1×1×number of classes. In some examples, the CNN may include a fully connected layer(s) such that the output of one or more of the layers of the CNN may be provided as input to a fully connected layer(s) of the CNN. In some examples, one or more convolutional streams may be implemented by the DNN, and some or all of the convolutional streams may include a respective fully connected layer(s). In some non-limiting embodiments, the DNN may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the DNN, this is not intended to be limiting. For example, additional or alternative layers may be used in the DNN, such as normalization layers, SoftMax layers, and/or other layer types. In embodiments where the DNN includes a CNN, different orders and numbers of the layers of the CNN may be used depending on the embodiment. In other words, the order and number of layers of the DNN is not limited to any one architecture.

In addition, some of the layers may include parameters (e.g., weights and/or biases), such as the convolutional layers and the fully connected layers, while others may not, such as the ReLU layers and pooling layers. In some examples, the parameters may be learned by the DNN during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

In operation, the acoustic model 124 may receive audio data 122 that is captured via input devices 114 (e.g., a microphone) on the client devices 102. For example, as a user is speaking into a microphone while playing a video game, the user's speech may be captured by the client application 108 prior to transmission to another user and passed to the acoustic model 124, where the audio data 122 may be analyzed—e.g., processed through a DNN—to generate outputs corresponding to characters or symbols representing the speech of the user. For example, the DNN may output confidence values corresponding to any number of characters or symbols, and the character or symbol with a highest confidence may be determined as the character corresponding to the speech for the given instance of the DNN—e.g., corresponding to a time step. As such, as a user is speaking, the acoustic model 124 may output confidence values corresponding to a set of predicted characters (e.g., alphabetical, numerical, punctuation characters) that the DNN is trained to predict. This process may be repeated until characters are determined for segments of audio, and the characters may then be passed to the language model 126 to string together characters to form words or phrases for analysis of whether the words or phrases are appropriate or inappropriate.

In some embodiments, prior to being applied to the acoustic model, the audio data 122 may be converted to an appropriate format for the DNN of the acoustic model 124 to process. For example, the audio data may be converted to a monotone format with a specific audio frequency (e.g., 60 kHz) in order to allow the acoustic model 124 to effectively process the audio data 122 and compute accurate predictions. The DNN of the acoustic model 124 may output characters at a given frequency (e.g., a single character per each 20 millisecond of audio data). As a result, and because a single spoken character may not align with each time step, the output of the DNN may not correspond to exact words or phrases. For example, if a user were to speak "cat rat," the DNN may output data indicative of "ccaaattt rrraaatt." As a result, in some embodiments, the DNN may include additional layer(s) and/or functions for filtering the results to output more accurate predictions (e.g., "cat rat"). In other embodiments, the language model 126 may analyze the outputs—in addition to or alternatively from the acoustic model 124—to determine the words or phrases represented by the outputs of the acoustic model 124 prior to analyzing the words or phrases for appropriateness.

The language model 126 may receive a set of predicted characters from the acoustic model 126, and the sets of characters may be analyzed to predict strings of words from the sets of characters. In the example above where the acoustic model 124 outputs data indicative of "ccaaattt rrraaatt," the language model 126 may output ("cat" 1, 10) and ("rat," 14, 22), where 1, 10, 14, and 22 correspond to a beginning and ending time of the words—represented as bounding boxes, in embodiments, corresponding to the time within the audio segment corresponding to the characters, words, or phrases—as audio segment indices (e.g., where each audio segment is 20 ms in length). The output from the language model 126 may then be mapped to a timestamp of the audio clip—e.g., using the bounding boxes or data representative thereof. For example, the words "cat" and "rat" may be mapped to the moments in an audio clip when a user spoke the words "cat" and "rat." Advantageously, by mapping each word to a series of time stamps, portions of audio containing inappropriate language may be easily located, edited, and/or recorded for further analysis or reporting.

The word parser 128 may extract individual identified words or phrases in a string of words. The identified words or phrases may be compared against one or more word lists 130 (or dictionaries) of inappropriate words or phrases. When an identified word or phrase is found in the word lists 130, the identified word or phrase may be classified as inappropriate. Inappropriate words may include, without limitation, words that may cause resentful displeasure, are highly irritating, angering, annoying, unpleasant, disagreeable to the senses, repugnant to the moral sense, insulting, attacking, profane, derogatory, taunting, harassing, or are otherwise deemed inappropriate. A dictionary of offensive words may be universal (e.g., apply to each game or application type) or may be customized based on application attributes associated with an instance of an application or instance of gameplay. Application attributes may include specific applications, specific games, region, language, user profile, application category, game rating (e.g., ESRB rating), or user-specified classification attributes (e.g., user may choose not to hear certain words). By leveraging a dictionary that is specific to a particular application, the system may easily scale to new and different applications while still performing effectively within each different application. For example, a phrase used within a first game or application may be considered harassing while the same phrase used in a second game may be considered benign. Similarly, the same phrase may be considered inappropriate when directed to a fellow player, but may be benign when directed to a situation, circumstance, or result. Additionally, as words or phrases gain or lose meaning over time (e.g., due to modern topics, trends, fads, etc.), host application 118 may amend the dictionary of offensive words in real-time or near real-time.

Further, to maintain dictionary relevance, in some embodiments, application session data may be applied to a machine learning model to update the word list 130 of inappropriate language, where the machine learning model may learn user response patterns from application session data. Within an instance of a game or based on several instances of gameplay, the machine learning model may update, periodically and/or incrementally, the dictionary of inappropriate language based on an analysis of conversations between users and subsequent user reactions. For example, where a comment from a user elicits another user to speak harassing words, words or phrases corresponding to the comment may be added to the dictionary.

In addition to cross-checking words or phrases against the word list 130, the words or phrases may also be analyzed for context by the word parser 128—e.g., in combination with the language model 126. For example, in some embodiments, the language model 126 may include a neural network (e.g., DNN) trained to identify contexts in which words or phrases are offensive and contexts in which they are not. For example, a word or phrase spoken to a teammate in a game after the teammate does something good may be interpreted by the teammate as inoffensive, whereas the same word spoken to the teammate after the teammate has done something bad may be interpreted as offensive. Further, where the language model includes a non-deep learning application, heuristics may be used to determine context such as by analyzing audio, in-game events, user input behavior, and/or other game-related information in view of detected inappropriate words or phrases to determine the context and thus whether the words or phrases should ultimately be marked as inappropriate.

Audio data corresponding to language that has been identified as being inappropriate by the word parser 128 may be output to the word mask 132. The word mask 132 may edit the audio data before the audio data is transmitted to another user device 102. For example, using timestamps—or bounding boxes corresponding thereto—associated with identified inappropriate language, word mask 132 may tag audio data corresponding to the offensive language. The tagged audio data may then be edited in real-time or near real-time to mute, delete, obfuscate, or otherwise modify the audio data such that an intended recipient (e.g., another user to whom the language was intended) may never hear the inappropriate language. In some embodiments, the corresponding audio data may also further processed for reporting. Moreover, by selectively recording audio clips rather than all audio communicated over the network(s) 106, the processing, energy, storage and bandwidth requirements of the system are reduced because only those portions of audio data that are found to include inappropriate language are stored and/or submitted in a report, as compared to conventional systems where, for example, an entire instance of online gameplay may be recorded and stored so that a user may report harassing behavior in a video game. In addition, because only audio clips identified as containing inappropriate language need to be transmitted over the network (instead of the entire audio stream), the networking requirements are also reduced, and the integrity of the system is more likely to be maintained as compared to conventional systems. Thus, the user is able to accomplish the same goals (e.g., curbing toxic behavior in online interactions) while reducing the burden on the system 100 and the network(s) 106 supporting the system 100.

Figure 2:
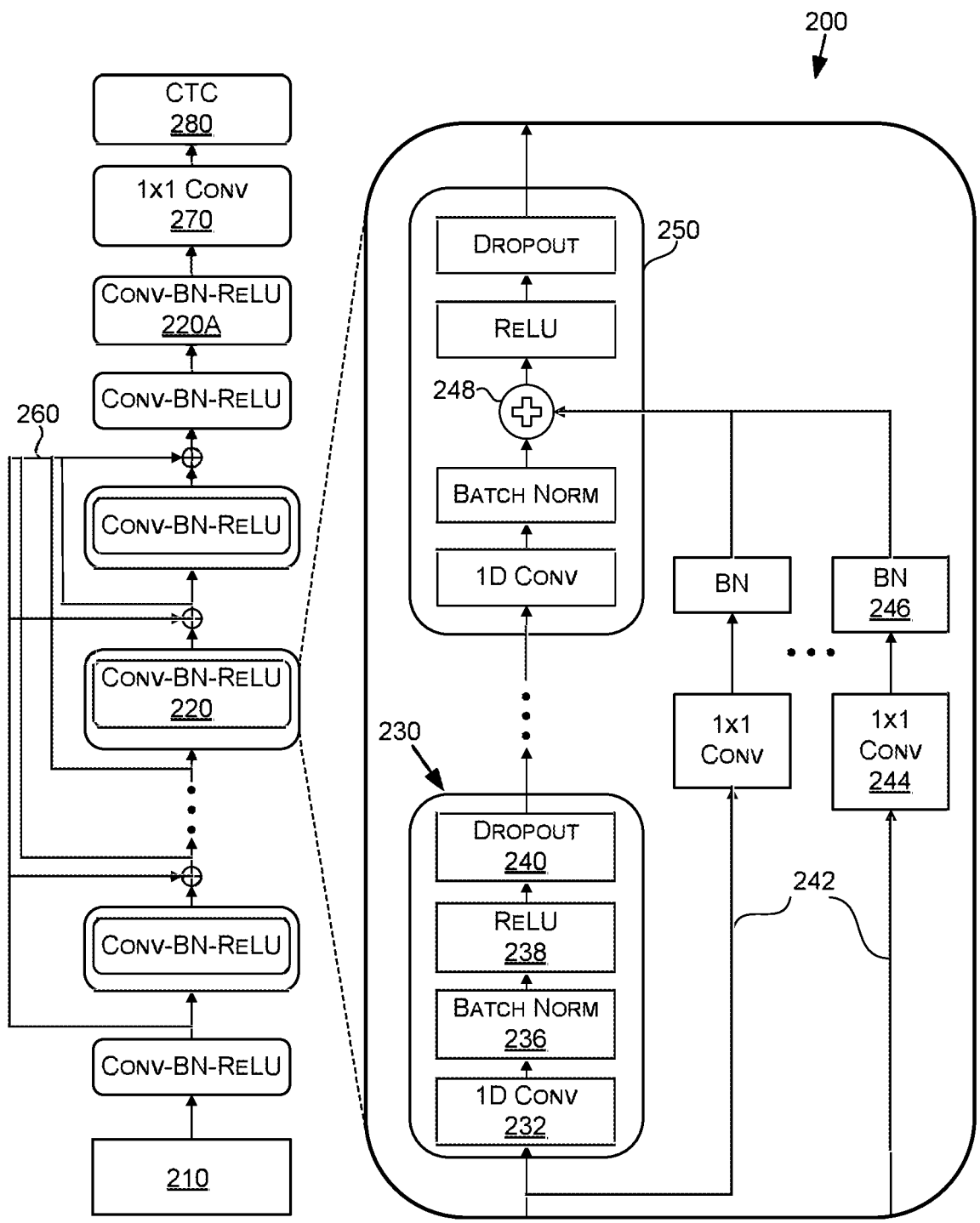
FIG. 2 is an example neural network architecture for an acoustic model of the system of FIG. 1B, in accordance with some embodiments of the present disclosure.

Now referring to FIG. 2, FIG. 2 illustrates an example acoustic model architecture for computing output data indicative of characters corresponding to a textual representation of audio data. FIG. 2 shows a block acoustic model architecture for a CNN 200, an input block 210, a plurality of operator blocks 220A, a sub-block 230, a last sub-block 240, and residual links 260. The CNN 200 is intended as an example that may be suitable for embodiments of the present disclosure. However, other CNN architectures, or other DNN or machine learning model types may be used in addition to or alternatively from the CNN 200 without departing from the scope of the present disclosure.

Each block 220 may include a plurality of sub-blocks 230 and a last-block 250. Each of the plurality of sub-blocks may correspond to a 1D convolutional layer(s) 232, a batch normalization layer(s) 236, a ReLU layer(s) or function 238, a dropout layer(s) or function 240, and/or a Connectionist Temporal Classification (CTC) block 280. In operation, input block 210 may include audio data in a monotone format (e.g., as converted from a raw audio data format) that may be applied to the CNN 200 at a frequency that may be specified for the acoustic model. The audio data may be passed to a first operator block, which may perform several prediction operations and then pass the output to a subsequent operator block. Each of the plurality of operator blocks 220A may be connected directly to a last sub-block. For example, last sub-block 250 may receive outputs from previous operator blocks via a plurality of residual connections 242. The residual connections 242 may be projected through a 1×1 convolution operation 244 to account for different numbers of input and output channels, then through a batch normalization layer 246. The output from the batch normalization layer 246 may then undergo a summing operation 248 with the output of a batch normalization layer 250 of the last sub-block 240. The result of this summing operation may be passed through a ReLu and/or dropout layer(s) to produce an output of character scores for sequence elements, which may be represented by a matrix, for the current block 220A. The output may then be provided to a subsequent block. A last block 220B may output resultant data to a final 1×1 convolutional block 270 to account for different numbers of input and output channels, which may then be passed to CTC block 280. CTC block 280 may perform a CTC operation to remove duplicate character predictions. For example, the final output from the 1×1 convolution block 270 may be "ccaaattttt" where the actual word from the input audio data is "cat." The CTC operation may remove the additional characters to output "cat." The final output of character predictions may be provided to a language model 126 for further processing and word parsing.

Figure 3:
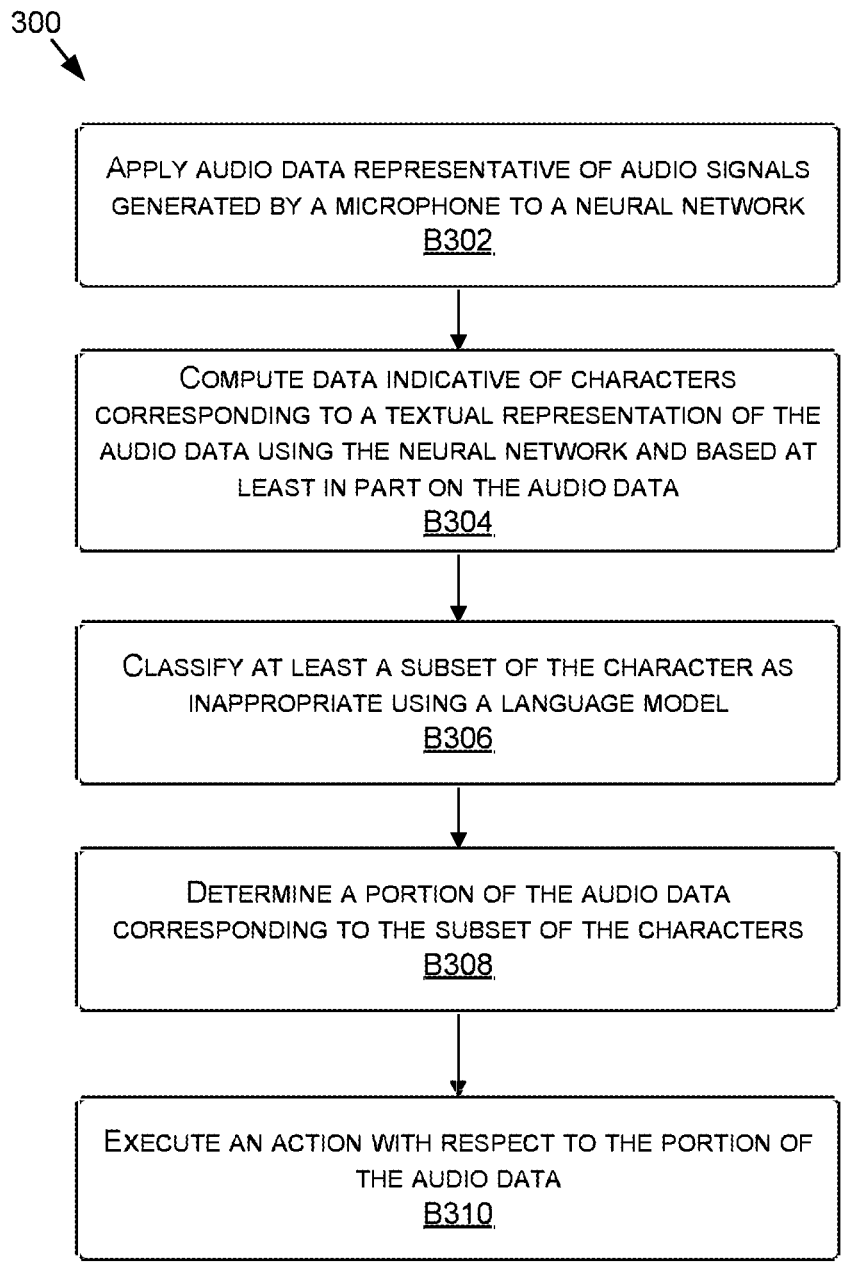
FIG. 3 is a flow diagram showing a method for classifying inappropriate language on a client device using a language model, in accordance with some embodiments of the present disclosure.
Figure 4:
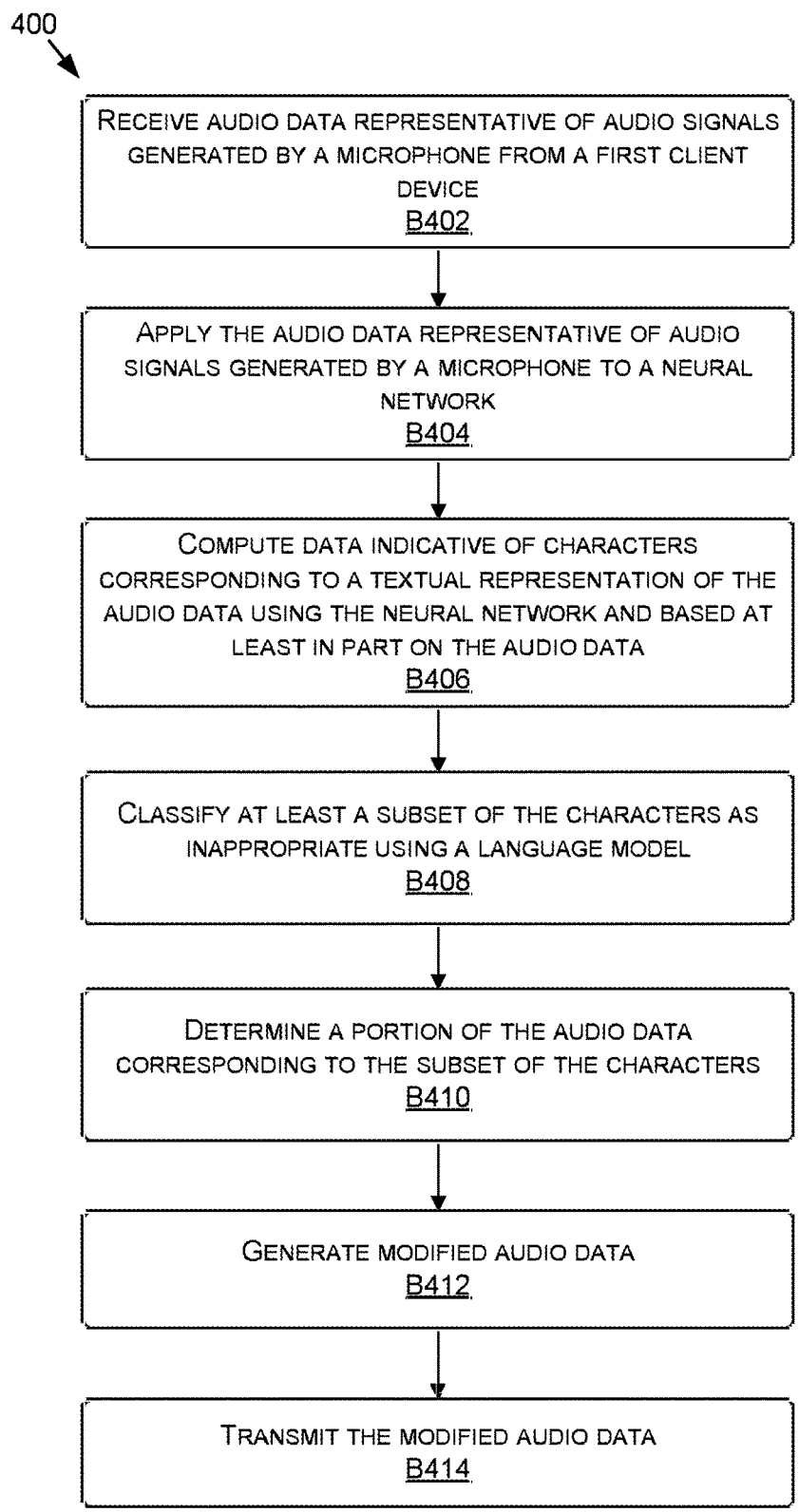
FIG. 4 is a flow diagram showing a method for generating modified audio data at a server, in accordance with some embodiments of the present disclosure.

Now referring to FIGS. 3 and 4, each block of methods 300 and 400, described herein, comprises a computing process that may be performed using any combination of hardware, firmware, and/or software. For instance, various functions may be carried out by a processor executing instructions stored in memory. The methods 300 and 400 may also be embodied as computer-usable instructions stored on computer storage media. The methods 300 and 400 may be provided by a standalone application, a service or hosted service (standalone or in combination with another hosted service), or a plug-in to another product, to name a few. In addition, methods 300 and 400 are described, by way of example, with respect to the system 100 of FIG. 1A and the system 120 of FIG. 1B. However, these methods 300 and 400 may additionally or alternatively be executed by any one system, or any combination of systems, including, but not limited to, those described herein.

FIG. 3 is a flow diagram showing a method 300 for classifying at least a subset of characters as inappropriate, in accordance with some embodiments of the present disclosure. The method 300, at block B302, includes applying audio data representative of audio signals generated by a microphone to a neural network. For example, audio data received via input devices 114 may be applied to one or more DNNs of the acoustic model 124.

The method 300, at block B304, includes computing data indicative of characters corresponding to a textual representation of the audio data using the neural network and based at least in part on the audio data. For example, as a user is speaking, the acoustic model 124 may output confidence values corresponding to a set of predicted characters (e.g., alphabetical, numerical, punctuation characters) that the neural network is trained to predict. Whichever character of the set of predicted characters is associated with the highest confidence value at each instance of the neural network may be selected as the identified character.

The method 300, at block B306, includes classifying at least a subset of character as inappropriate using a language model. For example, the language model 126 and/or the word parser 128 may extract individual identified words or phrases and classify them as appropriate or inappropriate. The identified words may be compared against one or more dictionaries of offensive words in a word list 130, and/or may be analyzed for context. When an identified word or phrase is found in the one or more dictionaries, the identified word or phrase may be classified as offensive.

The method 300, at block B308, includes determining a portion of the audio data corresponding to the subset of the characters. For example, audio data corresponding to language that has been identified as being offensive by the word parser 128 may be output to the word mask 132. The word mask 132 may edit the audio data before the audio data is transmitted to another user. For example, using timestamps associated with identified inappropriate language, the word mask 132 may tag audio data corresponding to the offensive language.

The method 300, at block B310, includes executing an action with respect to the portion of the audio data. For example, tagged audio data may be edited in real-time or near real-time to mute, delete, obfuscate, or otherwise modify the audio data such that an intended recipient (e.g., another user to whom the offensive language was intended) may never hear the offensive language. The corresponding audio data may also be reported—e.g., automatically—and the report may include at least the portion of the audio data that is inappropriate, and further may include the corresponding highlight (e.g., as a video clip) of the instance of the game that the audio corresponds to.

Now referring to FIG. 4, FIG. 4 is a flow diagram showing a method 400 for generating modified audio data at a server, in accordance with some embodiments of the present disclosure. The method 400, at block B402, includes receiving audio data representative of audio signals generated by a microphone from a first client device. For example, audio data generated by an input device(s) 114A of the client device(s) 102A may be received—e.g., by the client application 108A.

The method 400, at block B404, includes applying the audio data representative of the audio signals generated by the microphone to a neural network. For example, the audio data may be applied to a DNN of the acoustic model 124.

The method 400, at block B406, includes computing data indicative of characters corresponding to a textual representation of the audio data using the neural network and based at least in part on the audio data. For example, as a user is speaking, the acoustic model 124 may output confidence values corresponding to a set of predicted characters (e.g., alphabetical, numerical, punctuation characters) that the DNN is trained to predict. Whichever character of the set of predicted characters is associated with the highest confidence value at each instance of the DNN may be selected as the identified character for the given time step.

The method 400, at block B408, includes classifying at least a subset of the characters as inappropriate using a language model. For example, the language model 126 and/or the word parser 128 may extract individual identified words or phrase and may compare the words or phrases to a word list 130 associated with the client application 108A. When an identified word is found in the one or more dictionaries, the identified word may be classified as inappropriate.

The method 400, at block B410, includes determining a portion of the audio data corresponding to the subset of the characters. For example, the segment(s) of the audio data corresponding to the inappropriate language may be provided to the word mask 132, and the word mask 132 may edit the audio data before the audio data is transmitted to the client device 102B—e.g., via the application server(s) 104. For example, using timestamps associated with identified offensive language, the word mask 132 may tag audio data corresponding to the offensive language.

The method 400, at block B412, includes generating modified audio data. For example, the tagged or flagged audio data may be edited in real-time or near real-time to mute, delete, obfuscate, or otherwise modify the audio data such that an intended recipient may never hear the inappropriate language—and the client device 102B may never receive the original audio data.

The method 400, at block B414, includes transmitting the modified audio data. For example, a first user playing a game on client device 102A may speak a derogatory slur into a microphone (e.g., input device 114A) during an instance of gameplay (e.g., via client application 108A) and, before audio data corresponding to the derogatory slur is transmitted over network 106 for a second user to hear the derogatory slur, the language classifier of client application 108A may identify the derogatory slur as offensive language and mute the derogatory slur. Modified audio data with the muted derogatory slur may then be transmitted by the communication interface 112A, via network 106 and/or the application server(s) 104, to the communication interface 112B of the client device 102B where the second user may hear the modified audio data.

Game Streaming System

Figure 5:
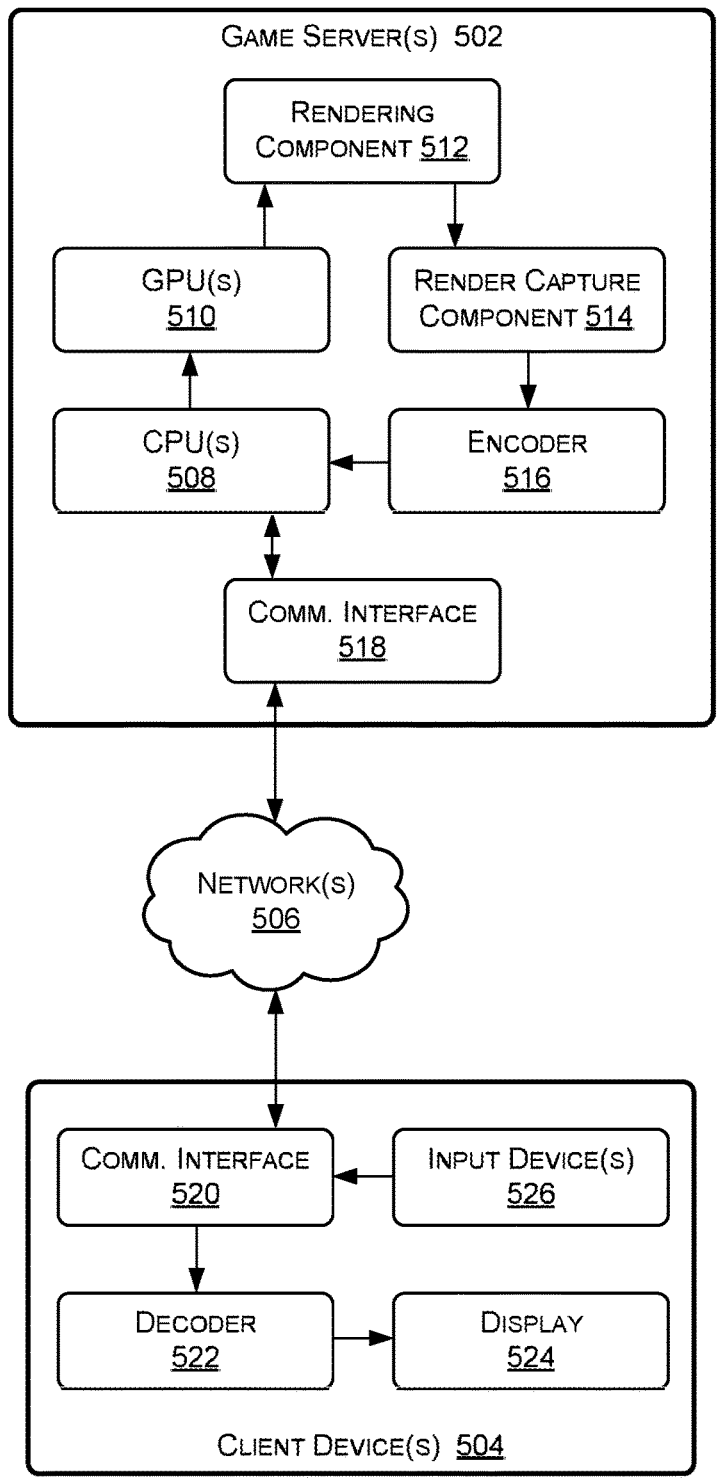
FIG. 5 is an example system diagram for a game streaming system, in accordance with some embodiments of the present disclosure.

Now referring to FIG. 5, FIG. 5 is an example system diagram for a game streaming system 500, in accordance with some embodiments of the present disclosure. FIG. 5 includes game server(s) 502 (which may include similar components, features, and/or functionality to the application server(s) 104 of FIG. 1 and/or the computing device 600 of FIG. 6), client device(s) 504 (which may include similar components, features, and/or functionality to the client devices 102 of FIG. 1 and/or the computing device 600 of FIG. 6), and network(s) 506 (which may be similar to the network(s) 106 of FIG. 1). In some embodiments of the present disclosure, the system 500 may be implemented.

In the system 500, for a game session, the client device(s) 504 may only receive input data in response to inputs to the input device(s), transmit the input data to the game server(s) 502, receive encoded display data from the game server(s) 502, and display the display data on the display 524. As such, the more computationally intense computing and processing is offloaded to the game server(s) 502 (e.g., rendering—in particular ray or path tracing—for graphical output of the game session is executed by the GPU(s) of the game server(s) 502). In other words, the game session is streamed to the client device(s) 504 from the game server(s) 502, thereby reducing the requirements of the client device(s) 504 for graphics processing and rendering.

For example, with respect to an instantiation of a game session, a client device 504 may be displaying a frame of the game session on the display 524 based on receiving the display data from the game server(s) 502. The client device 504 may receive an input to one of the input device(s) and generate input data in response. The client device 504 may transmit the input data to the game server(s) 502 via the communication interface 520 and over the network(s) 506 (e.g., the Internet), and the game server(s) 502 may receive the input data via the communication interface 518. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 512 may render the game session (e.g., representative of the result of the input data) and the render capture component 514 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 502. The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

Example Computing Device

Figure 6:
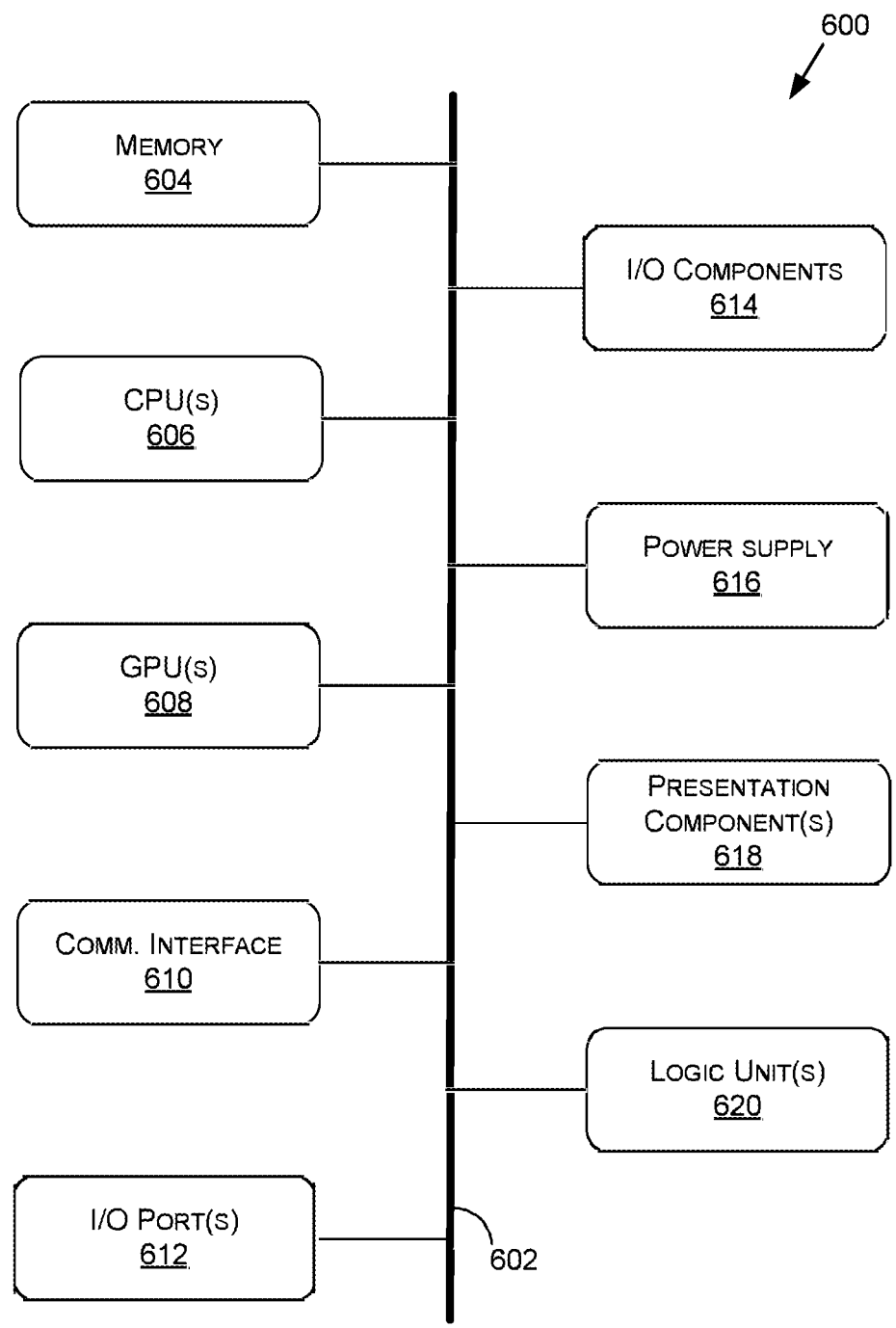
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   applying, to one or more first models, audio data generated using one or more microphones and during a session associated with a gaming application;
   determining, using the one or more first models, a sequence of characters corresponding to a textual representation of the audio data;
   generating, using one or more second models and based at least on the textual representation, an output that classifies at least a portion of the sequence of characters as inappropriate;
   determining a portion of the audio data corresponding to the at least the portion of the sequence of characters; and
   executing one or more actions with respect to the portion of the audio data.

2. The method of claim 1, wherein at least one of:
   one or more files associated with the one or more second models are included within a file directory associated with the gaming application;
   the one or more files are hidden when the file directory is shown; or
   the one or more files are prevented from being deleted from the file directory.

3. The method of claim 1, wherein the action comprises at least one of:
  generating a ticket associated with a reporting system;
  editing the portion of the audio data;
  annotating a portion of the textual representation that corresponds to the portion of the audio data as inappropriate; or
  sending data representing the portion of the audio data to a host computing device.

4. The method of claim 1, wherein the at least the portion of the sequence of characters is classified as inappropriate based at least on the at least the portion of the sequence of characters being one of profane language, abusive language, taunting language, derogatory language, or harassing language.

5. The method of claim 1, wherein:
  the one or more second models include at least a language model that generates the output that classifies the at least the portion of the sequence of characters as inappropriate; and
  the language model is trained based at least on content associated with the application.

6. The method of claim 1, wherein:
  at least the applying the audio data to the one or more first models, the determining the sequence of characters, and the generating the output is performed using a first client device associated with the session; and
  the method further comprises sending, using the first client device, at least a second portion of the audio data to at least one of a second client device associated with the session or a server associated with the session.

7. The method of claim 1, further comprising:
  receiving, using a first client device associated with the session, the audio data generated using the one or more microphones of a second client device associated with the session,
  wherein at least the applying the audio data to the one or more first models, the determining the sequence of characters, and the generating the output is performed using the first client device.

8. The method of claim 1, wherein:
  the session includes a gaming session associated with at least a first client device and a second client device; and
  the one or more second models are stored in one or more files of the gaming application and used during the gaming session by at least one of the first client device or the second client device.

9. The method of claim 1, further comprising:
  obtaining content data associated with the session of the gaming application, the content data representing one or more of sound associated with the session, one or more events associated with the session, or one or more user inputs associated with the session; and
  applying the content data to the one or more second models,
  wherein the generating the output that classifies the at least the portion of the sequence of characters is further based at least on the content data.

10. A system comprising:
  one or more processing units to:
    obtain audio data generated using one or more microphones and during a session associated with a gaming application;
    determine a sequence of characters corresponding to a textual representation of the audio data;
    generate, using one or more models and based at least on the textual representation, an output that classifies at least a portion of the sequence of characters as inappropriate;
    determine a portion of the audio data corresponding to the at least the portion of the sequence of characters; and
    execute one or more actions with respect to the portion of the audio data.

11. The system of claim 10, wherein the one or more models are trained using a dictionary associated with the gaming application, the dictionary including one or more words indicated as being inappropriate for the gaming application.

12. The system of claim 10, wherein one or more models are trained using one or more words that are indicated as being inappropriate based at least on a context associated with the gaming application.

13. The system of claim 10, wherein at least one of:
  one or more files associated with the one or more models are included within a file directory associated with the gaming application;
  the one or more files are hidden when the file directory is shown; or
  the one or more files are prevented from being deleted from the file directory.

14. The system of claim 10, wherein the action comprises at least one of:
  generating a ticket associated with a reporting system;
  editing the portion of the audio data;
  annotating a portion of the textual representation that corresponds to the portion of the audio data as inappropriate; or
  sending data representing the portion of the audio data to a host computing device.

15. The system of claim 10, wherein the at least the portion of the sequence of characters is classified as inappropriate based at least on the at least the portion of the characters being one of profane language, abusive language, taunting language, derogatory language, or harassing language.

16. The system of claim 10, wherein the determination of the sequence of characters corresponding to the textual representation is performed using a neural network that is separate from the one or more models.

17. The system of claim 10, wherein the system is comprised in at least one of:
  a system for performing real-time streaming;
  a system for generating or presenting virtual reality (VR) content;
  a system for generating or presenting augmented reality (AR) content;
  a system for performing light transport simulation;
  a system for performing deep learning operations;
  a system implemented using an edge device;
  a system for performing conversational artificial intelligence operations;
  a system incorporating one or more virtual machines (VMs);
  a system implemented at least partially in a data center; or
  a system implemented at least partially using cloud computing resources.

18. The system of claim 10, wherein:
  the determination of the sequence of characters corresponding to the textual representation comprises generating, using one or more acoustic models and based at least on the audio data, a second output representative of the sequence of characters corresponding to the textual representation;

the one or more models include one or more language models; and the generation of the output is based at least on the one or more language models processing the second output.

19. A processor comprising:

one or more processing units to:

apply, to one or more models, audio data generated using one or more microphones and during a session associated with a gaming application, the one or more models being stored in one or more files of the gaming application;

output, using the one or more models and based at least on the audio data, data that classifies at least a portion of a sequence of characters corresponding to a textual representation of the audio data as inappropriate;

determine a portion of the audio data that corresponds to the at least the portion of the sequence of characters; and execute one or more actions with respect to the at least the portion of the audio data.

20. The processor of claim 19, wherein the processor is comprised in at least one of:

a system for performing real-time streaming;

a system for generating or presenting virtual reality (VR) content;

a system for generating or presenting augmented reality (AR) content;

a system for performing light transport simulation;

a system for performing deep learning operations;

a system implemented using an edge device;

a system for performing conversational artificial intelligence operations;

a system incorporating one or more virtual machines (VMs);

a system implemented at least partially in a data center; or a system implemented at least partially using cloud computing resources.

* * * * *